(12) United States Patent
Ulgen (10) Patent No.: US 10,710,687 B2
(45) Date of Patent: Jul. 14, 2020

(54) UNIDIRECTIONAL TORQUE BOOSTING PROPELLER

(71) Applicant: Mehmet Nevres Ulgen, Istanbul (TR)

(72) Inventor: Mehmet Nevres Ulgen, Istanbul (TR)

( * ) Notice: Subject to any disclaimer, the term of this patent is extended or adjusted under 35 U.S.C. 154(b) by 68 days.

(21) Appl. No.: 15/819,330

(22) Filed: Nov. 21, 2017

(65) Prior Publication Data
US 2019/0100293 A1 Apr. 4, 2019

(51) Int. Cl.
| | | |
|---|---|---|
| *B63H 1/20* | (2006.01) | |
| *B63H 1/28* | (2006.01) | |
| *F16D 41/18* | (2006.01) | |
| *B63H 23/34* | (2006.01) | |
| *B63H 5/10* | (2006.01) | |

(52) U.S. Cl.
CPC ............. *B63H 1/20* (2013.01); *B63H 1/28* (2013.01); *B63H 23/34* (2013.01); *F16D 41/185* (2013.01); *B63H 2001/283* (2013.01); *B63H 2005/106* (2013.01)

(58) Field of Classification Search
CPC .... B63H 23/34; B63H 1/28; B63H 2005/106; B63H 2001/283; F16D 41/185; F16D 2023/123
USPC .......................................... 440/79, 80–81, 83
See application file for complete search history.

(56) References Cited

U.S. PATENT DOCUMENTS

| | | | | |
|---|---|---|---|---|
| 4,117,652 | A * | 10/1978 | Jones ..................... | A01D 34/69 180/19.1 |
| 6,478,641 | B2 | 11/2002 | Jordan | |
| 6,702,631 | B2 | 3/2004 | Jordan | |
| 6,821,169 | B2 | 11/2004 | Jordan | |
| 7,661,329 | B2 * | 2/2010 | Cali ...................... | F16D 41/185 464/37 |
| 9,868,497 | B2 | 1/2018 | Ulgen | |
| 10,144,283 | B2 * | 12/2018 | Yoshimura ........... | B60K 17/344 |
| 2003/0070407 | A1 * | 4/2003 | McDonner ............. | A01D 34/68 56/12.7 |

* cited by examiner

*Primary Examiner* — Christopher Verdier
(74) *Attorney, Agent, or Firm* — Vidas, Arrett & Steinkraus, P.A.

(57) ABSTRACT

A front propeller on a main shaft communicated from one end to an engine transmission; the propeller having a hub and a plurality of blades extending radially outwardly from the hub; a rear propeller co-axially to, and spaced apart from, the front propeller rearwardly in an axial direction having a hub and a plurality of blades extending radially outwardly from the hub. An adaptor is coaxial with the main shaft and comprising a second shaft for supporting the rear propeller. A plurality of pitched-formed seating surfaces having ramps, are spaced apart from the second shaft in an axial direction. An adaptor communicates with the rear side of the front propeller in the axial direction; a plurality of locking elements are movable in the axial direction, each being in contact with the seating surfaces of the adaptor, and communicate with the rear propeller from the other end.

7 Claims, 11 Drawing Sheets

UNIDIRECTIONAL TORQUE BOOSTING PROPELLER

TECHNICAL FIELD

The present invention relates to a turbo propeller device which ensures coordination between a marine vessel propeller and torque of a shaft rotating the same and which automatically increases shaft torque.

BACKGROUND OF INVENTION

A marine vessel is impelled in the sea by a propeller which is attached to the engine from one end and to the other end of a shaft connected to a transmission. The extent of the shaft torque is substantially influential on the movement capacity of the marine vessel, since it accelerates the propeller. The output torque of the shaft is a function of engine power, speed and transmission reduction. In addition, shaft torque may not be at a satisfactory level for the thrust expected from the propeller. This is referred to as a "heavy" propeller in that the engine may not reach to the highest revolution power and figures, and for some, even some percentage (%) missing engine revolution may be acceptable, which means an increase in fuel costs and wear of the engine.

One of the solutions proposed for providing a better propeller thrust with the same engine power is to use a dual counter-rotating propeller structure, wherein the propellers are coaxially mounted on the shaft. The dual propeller structure is essentially based on the principle that the torque that is received from the shaft connected with the engine is transferred to a second shaft, with which the front propeller is in communication by means of a first power transfer means (for instance a gear wheel mechanism), and that the torque that is received from the shaft connected with the motor is transferred to a third shaft that is coaxial with the second shaft, the third shaft being in communication with the rear propeller by means of the second power transfer means. An exemplary arrangement for a dual propeller structure is disclosed in U.S. Pat. No. 6,821,169. Likewise, U.S. Pat. Nos. 6,702,631 and 6,478,641 disclose a dual propeller structure.

In the dual propeller structures mentioned in the above documents, the resultant thrust slightly increases as the torque that is necessary for rotating both propellers is provided by one power source, by the shaft which is in communication with the engine. This is because of the fact that two separate propeller devices entail two separate sources of energy loss. Thus, each propeller device has its own power transfer means, and they cause significant mechanical losses. Moreover, the rear propeller uses the water which has already been de-energized by the front propeller, causing a loss of efficiency.

On the other hand, U.S. Ser. No. 14/460,923 of the present inventor describes a turbo propeller system which is locked in one direction dependent on an engine shaft carrying the main propeller and rotates freely in the other direction. A turbo propeller is mounted with bearings that are locked in one direction and being free to rotate in the other direction. Thus, in the forward movement of the vessel, second propeller bearings are locked and water rotates the second propeller with a new, calculated pitch and provides extra torque gain to the main shaft. In rearward movement of the vessel, the turbo propeller rotates idly. The adaptation of the solution proposed in U.S. Ser. No. 14/460,923 to a conventional propeller that is already in use may involve relative challenges.

Another example of a coaxial propeller is propellers known as "Grim wheel" or "Vane wheel". In this type of propellers, the rear propeller has, in general, a larger diameter than that of the front propeller and while the inner part of the rear propeller acts mainly as a turbine, and the outer part has a thrusting function. However, Grim or Vane wheel propellers do not provide any torque contribution to the shaft, and they just provide contribution to the thrust.

DESCRIPTION OF THE INVENTION

It is an object of the present invention to develop the coordination between a main shaft in a vessel and shaft torque and to increase efficiency.

Another object of the present invention is to provide a propeller adaptable to conventional propellers which can increase shaft torque automatically with water leaving the front propeller.

The present invention relates to a propeller device comprising a main shaft in communication from one end to a marine vessel engine transmission; a front propeller provided on the main shaft, the front propeller having a hub and a plurality of blades extending radially outwardly from the hub; a rear propeller being co-axially to and spaced apart from the front propeller backwardly in an axial direction, the rear propeller having a hub and a plurality of blades extending radially outwardly from the hub. The device further comprises an adaptor being coaxial with the main shaft and comprising a second shaft for supporting the rear propeller and a plurality of pitched-formed seating surfaces having ramps, the seating surfaces being spaced apart from the second shaft in axial direction, and the adaptor in communication with the rear side of the front propeller in the axial direction; a plurality of locking elements resiliently movable in the axial direction, each being in contact with the seating surfaces of the adaptor from one end and in communication with the rear propeller from the other end.

When the vessel navigates forward, the locking elements abut against the rear surface of the previous pitch, thereby ensuring that the rear propeller rotates in the same direction as the front propeller. Thus, a water jet going out of the front propeller hits the rear propeller blades and thereby the thrust force of water of the front propeller is boosted. On the other hand, when the vessel navigates rearward, each locking element goes up from the ramps of the pitches and skips to the next pitch and rotates the rear propeller in the reverse direction with respect to the front propeller. In other words, in the rearward movement of the vessel, the rear propeller remains free relative to the front propeller in terms of direction of rotation.

According to a preferred embodiment of the invention, by means of the adapter, the rear propeller may be attached to a conventional propeller that is already in use and ensures the coordination between the front propeller and shaft torque and provides a gain of torque for the shaft.

The invention is also directed to a marine vessel including a propeller device according to the invention.

BRIEF DESCRIPTION OF THE DRAWINGS

For a better understanding of the configuration and advantages of the present invention, along with its additional elements, it should be evaluated in reference to the accompanying drawings, wherein.

REFERENCE NUMBERS OF THE PARTS IN THE DRAWINGS

1 Front propeller
2 Front propeller hub
3 Front propeller blade
4 Rear propeller hub
5 Rear propeller blade
6 Second shaft
7 Adapter
8 Front propeller shaft hole
9 Front propeller bolt connecting slots
10 Adapter bolt connecting slots
11 Adapter-front propeller connecting bolts
12 Disc
13 Disc shaft hole
14 Disc bolt slots
16 Disc connecting bolts
17 Disc locking element holes
18 Locking elements
19 Spring
20 Pin
21 Stud
22 Stud holes
23 First sealing member
24 Second sealing member
25 Second shaft bearing
26 Washer
Clamping nut
28 Ring
29 Pitch
30 Pitch back surface
31 Upper end of the pitch back surface
32 Seating surface
33 Locking element contact end
34 Rear propeller
Rear propeller end opening
36 Pitch front surface
37 Pin housing

DETAILED DESCRIPTION OF THE INVENTION

The propeller system according to the invention comprises a front propeller (1) and a rear propeller (34) arranged coaxially thereto. The front propeller (1) has a front propeller hub (2) and a plurality of front propeller blades (3) extending radially outwardly. The rear propeller (34) has a rear propeller hub (4) and a plurality of rear propeller blades (5) extending radially outwardly.

The front propeller (1) has a shaft hole (8) at the center and a main shaft (38) (shown in phantom line) which is, at one end, attached to the vessel engine (not shown) is passed through the shaft hole (8) and fixed rigidly. An adapter (7) is attached from the hub to the back side (that side without engine) of front propeller (1). The adapter (7) has a cylindrical form, the lateral surfaces of which are tapered in the flow direction of water in order to decrease water resistance. A plurality of front propeller bolt connecting slots (9) are made on the back face surface of the front propeller hub (2) for connecting the front propeller (1) and the adapter (7). Similarly, the adapter (7) has bolt connecting slots (10) formed circumferentially and extending in the axial direction, which are tightened and joined by means of the adapter-front propeller connecting bolts (11) after they are aligned with the front propeller connecting bolt slots (9). In this aspect, the propeller device according to the invention may be easily adapted to a conventional propeller.

The adapter (7) comprises a second shaft (6) on its back side, i.e. the side facing toward the rear propeller (34). Said second shaft (6) is preferably integral with the adapter (7), but optionally it may be arranged independently. The rear propeller (34) is supported rotationally on the second shaft (6) by means of a second shaft bearing (25). A first sealing member (23) is provided on the front side of the shaft bearing (25) and a second sealing member (24) is provided on the back side thereof. The tip of the second shaft (6) is threaded and a clamping nut (27) is passed through the rear propeller end opening (35) and is engaged and tightened to said threads. The second shaft (6) and the rear propeller (34) are therefore connected. In fact, the lower part of the clamping nut (27) rests on the base of the rear propeller end opening (35) when this nut is tightened. Due to its construction, a washer (26) may be placed between the second sealing member (24) and the clamping nut (27), and a ring (28) may be placed on the back side of the clamping nut (27).

Figure 7:
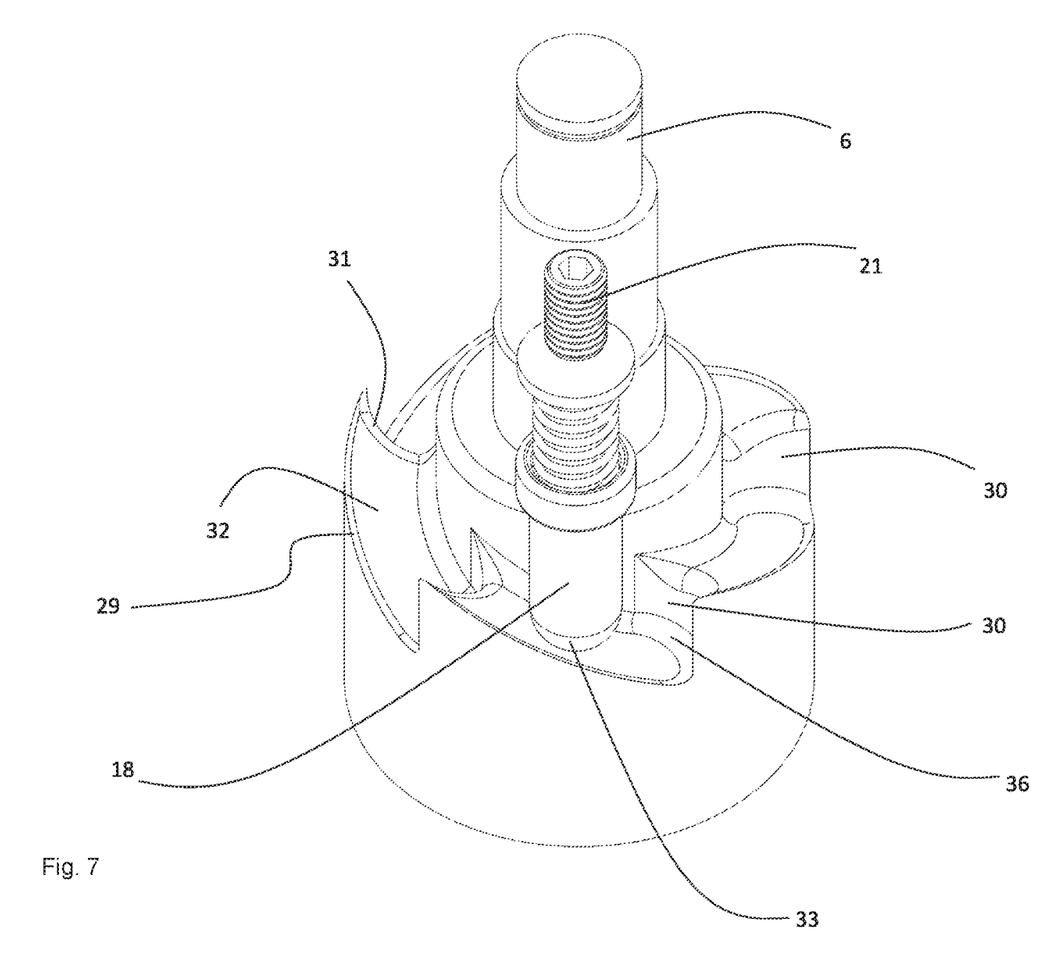
FIG. 7 is a perspective view of a middle core part of the adapter.

As shown in FIG. 7, in the middle core part of the adapter (7), there are configured structures in the form of pitches (29) spaced apart from the second shaft (6) in the axial direction. These pitches (29) are provided in circular shape around the axis and each pitch has a ramped/inclined seating surface (32). Each pitch (29) has a back surface (30) extending in axial direction. The pitch has a form such that the upper end of the back surface (31) is rounded. That section starting from the upper end of the pitch back surface (31) and moving downward from the inclined seating surface (32) toward the back surface of the next pitch is front surface of the pitch (36), which also has a rounded form.

The device according to the invention comprises a plurality of locking elements (18), one end of which is in communication with the rear propeller (34) and the other end of which is in communication with adapter seating surfaces (32). The locking elements (18) have a form similar to human finger and those parts that are in communication with seating surfaces (32), i.e. contact ends (33), have a rounded form. The locking elements (18) are through holes in an axial direction, each of which is provided with a pin (20). A spring (19) is placed between the head of each pin (20) and the upper end of the locking element (18). The pins (20) are placed in the pin housings (37) formed on the rear propeller hub (4) surface facing to the adapter. A stud (21) exerts pressure on the upper part of each pin (20) head. These studs (21) are inserted through the stud holes (22) formed in an axial direction on the rear propeller (34) end and are screwed and fixed to the threads formed within the holes.

Figure 1:
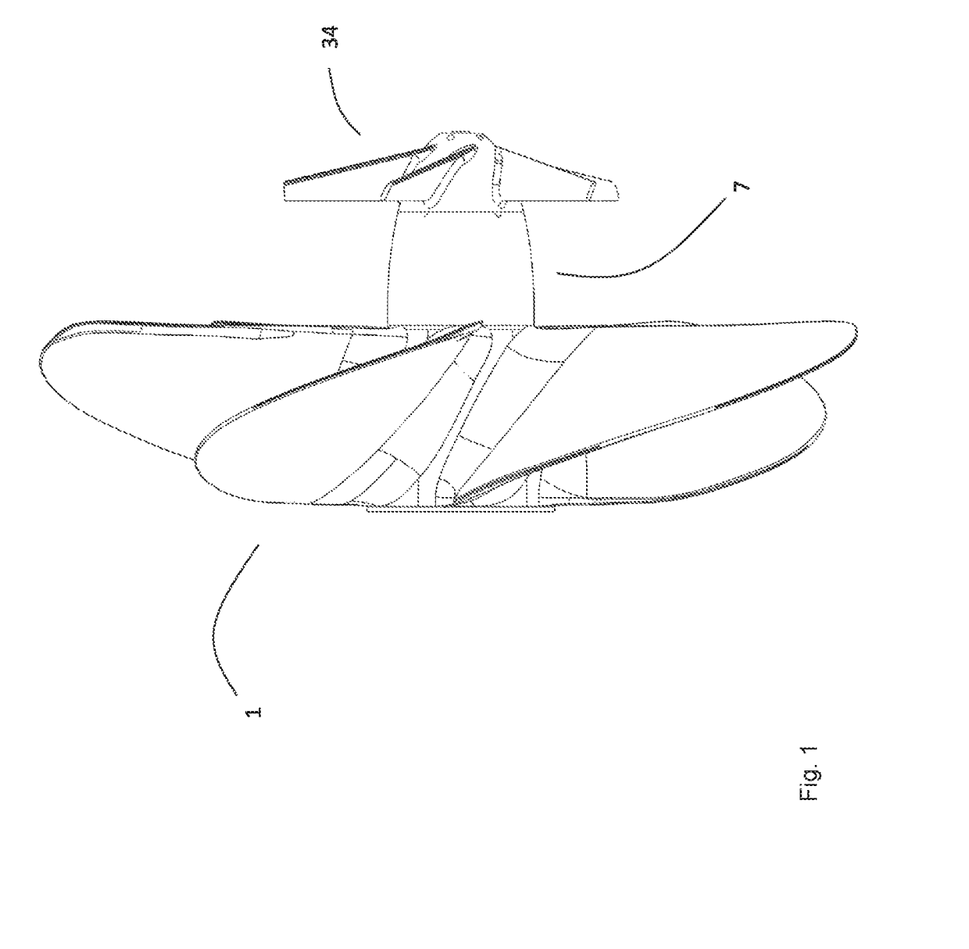
FIG. 1 is a side view of a propeller device according to the invention.
Figure 2:
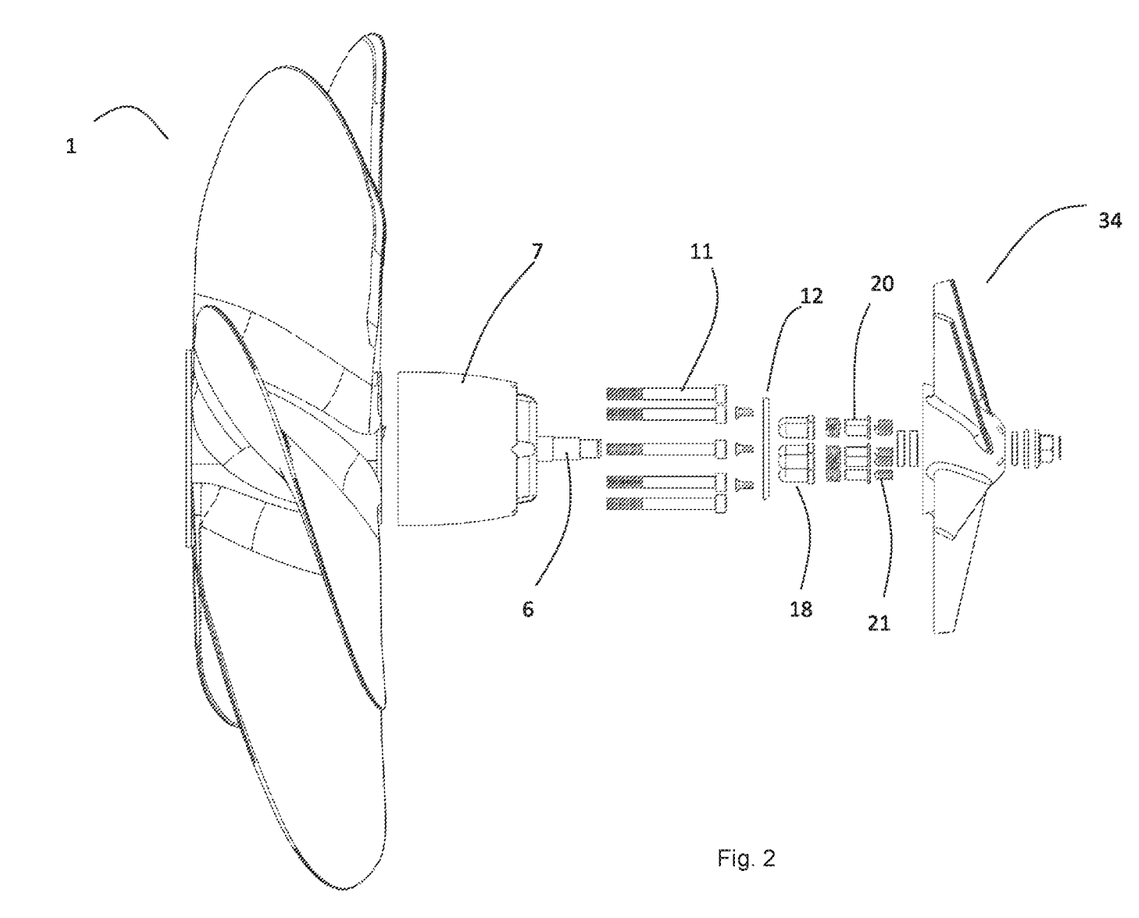
FIG. 2 is an exploded side view the propeller device according to the invention.
Figure 3:
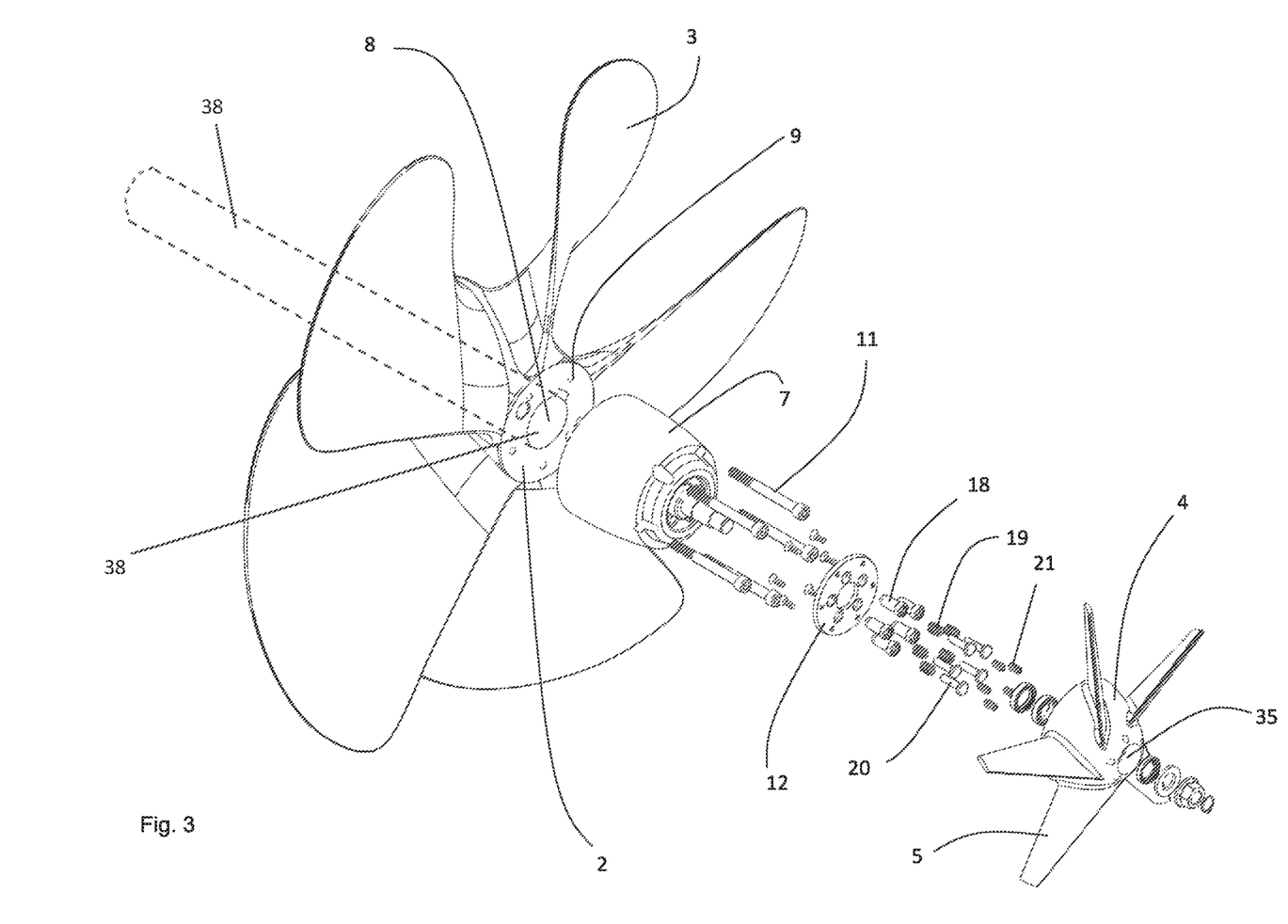
FIG. 3 is an exploded perspective view of the propeller device according to the invention.
Figure 4:
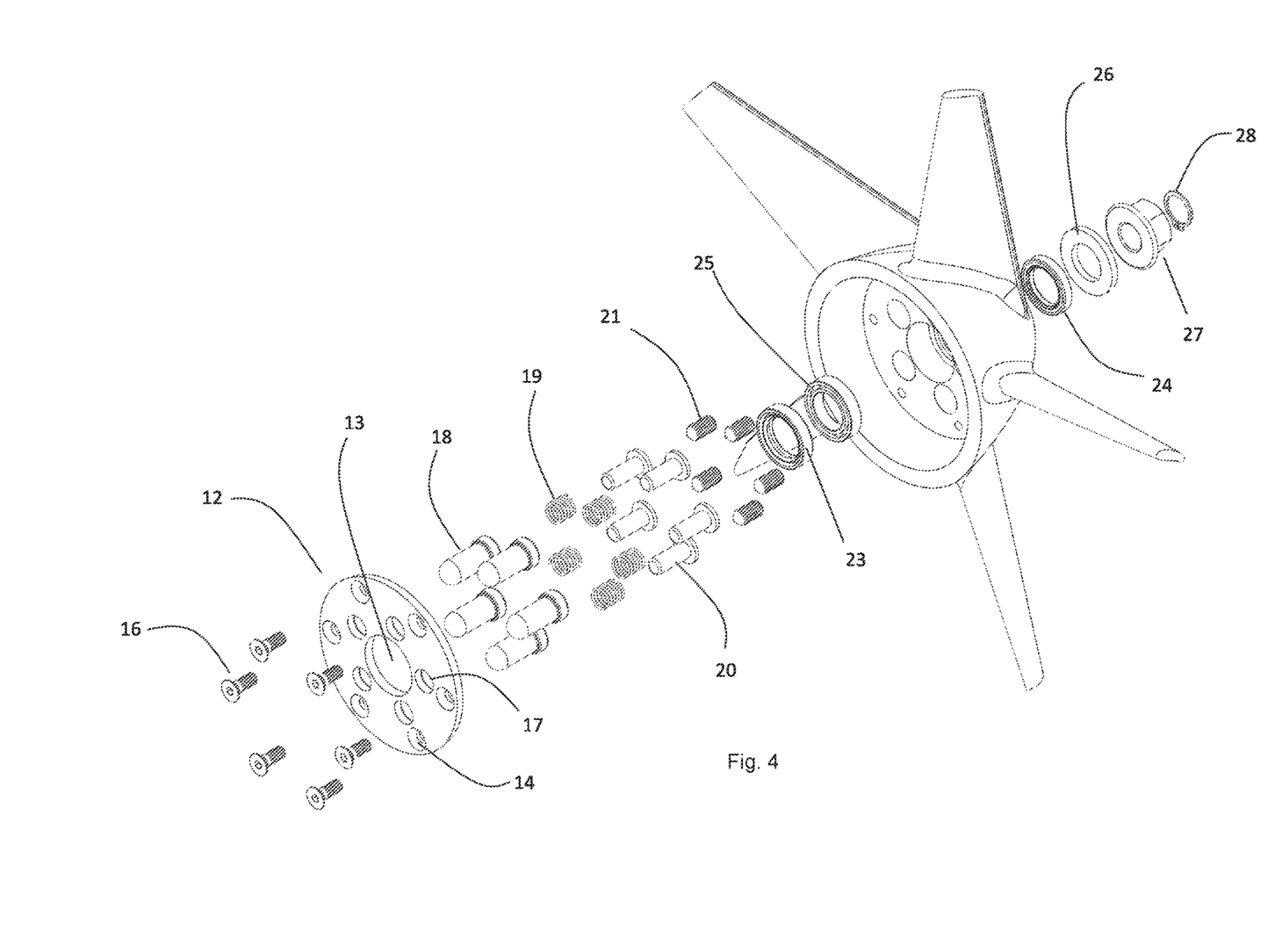
FIG. 4 is another exploded perspective view of the propeller device according to the invention.
Figure 5:
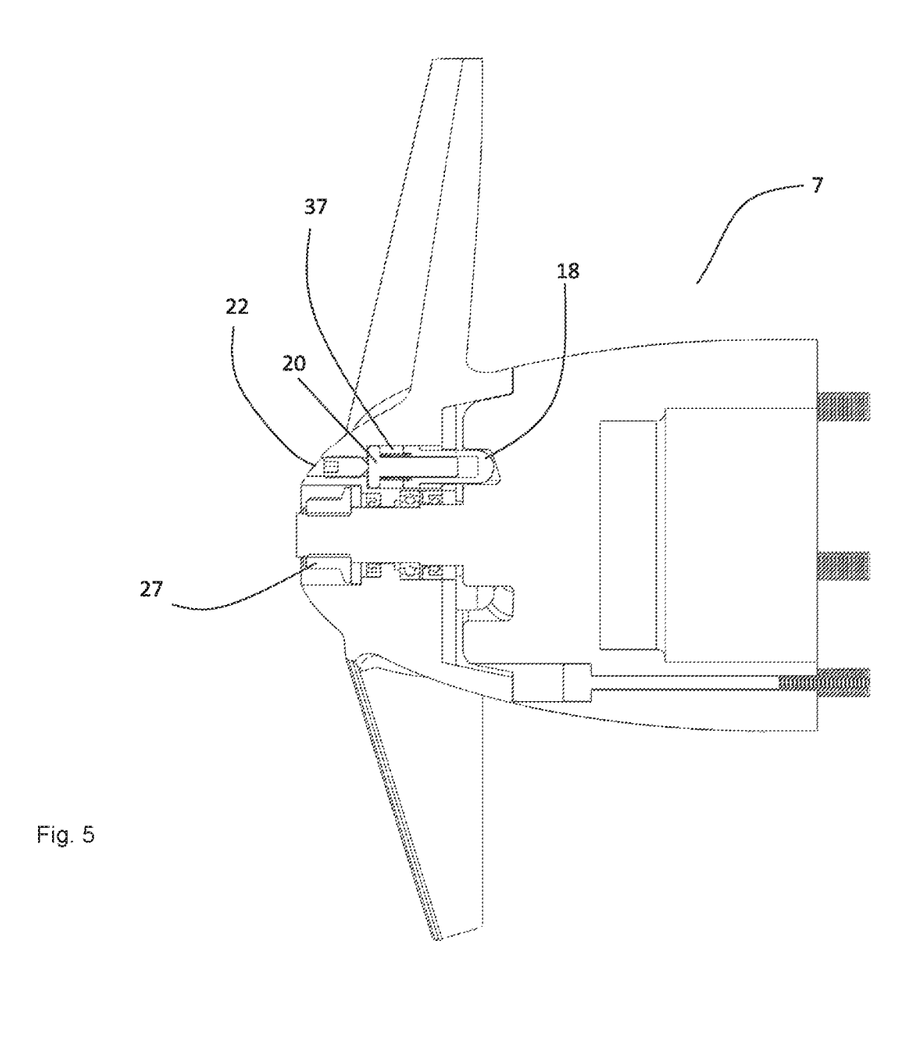
FIG. 5 is a side cross-sectional view of the adapter and the rear propeller of the propeller device according to the invention.
Figure 6:
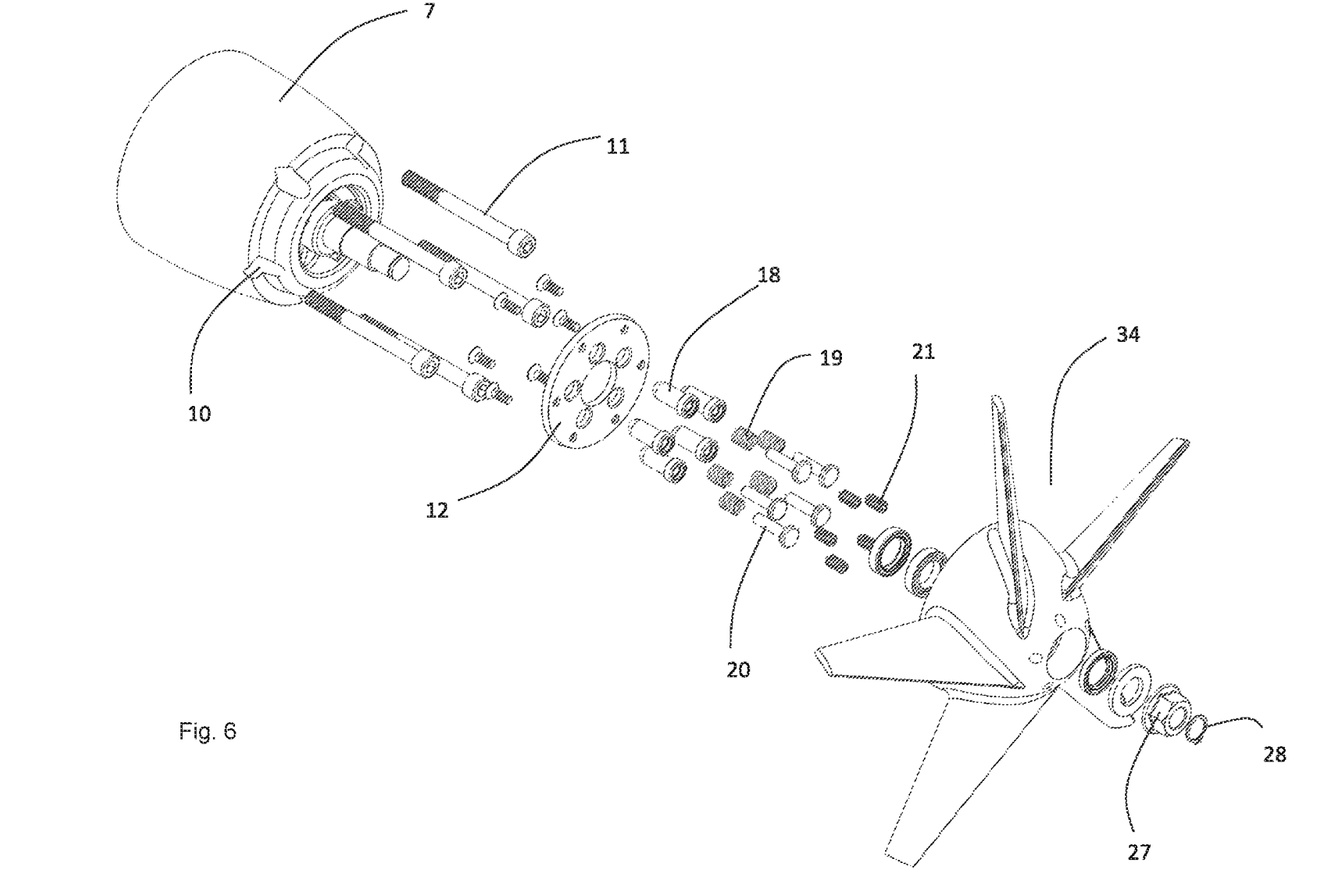
FIG. 6 is a perspective exploded view of the adapter and rear propeller of the propeller device according to the invention.

As shown in FIG. 5, the upper end of the locking elements (18) is located in the pin housings (37). The locking elements (18) are formed such that axial movement of each locking element within a pin housing (37) is possible. A disc (12) is connected to the surface of the rear propeller hub (4) facing to the adapter (7). For this purpose, a disc shaft hole (13) is provided on the center of the disc (6) for the passage of the second shaft (12), as well as a plurality of disc bolt connecting holes (14) formed circularly at that part close to the outer diameter of the disc. A plurality of disc connecting bolts (16) are passed through said holes, which are similarly passed through the aligned holes formed at the rear propeller hub (4) and tightened, providing a connection therebetween. The disc (12) also comprises disc locking element holes (17) that are formed circularly and allow the locking elements to pass therethrough.

Figure 8A:
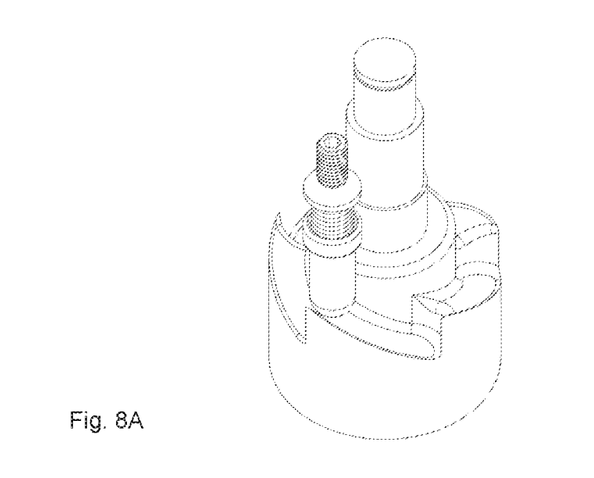
FIG. 8A is a perspective view of the locking element and adapter in the initial position prior to rear propeller locking.
Figure 8B:
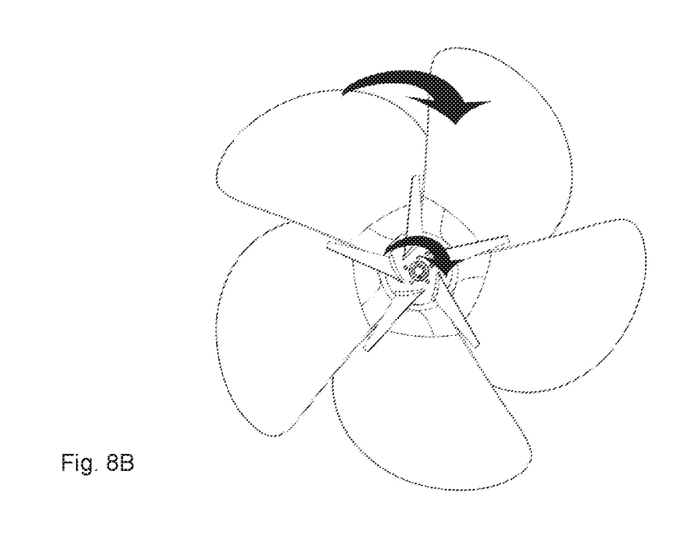
FIG. 8B shows the rotational condition of the propellers corresponding to the condition in FIG. 8A.
Figures 9A, 9B:
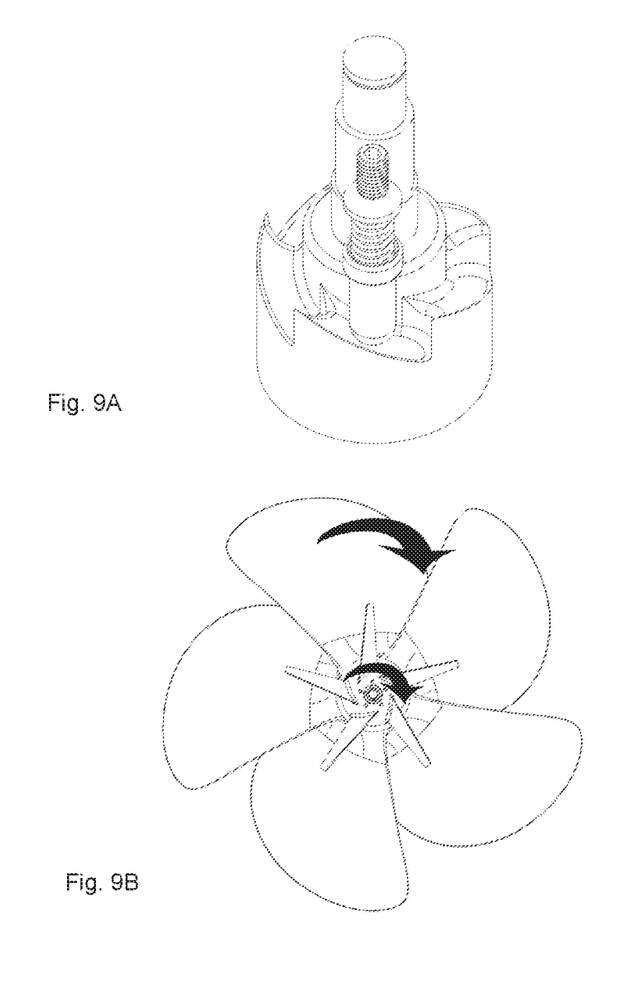
FIG. 9A is a perspective view of the locking element and adapter in the intermediate position prior to rear propeller locking.
FIG. 9B shows the rotational condition of the propellers corresponding to the condition in FIG. 9A.
Figure 10A:
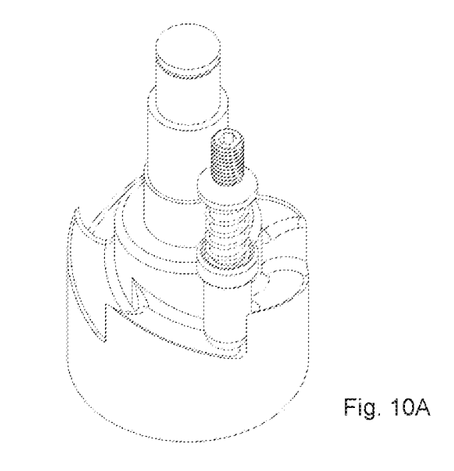
FIG. 10A is a perspective view of the locking element and adapter in the rear propeller locking position.
Figure 10B:
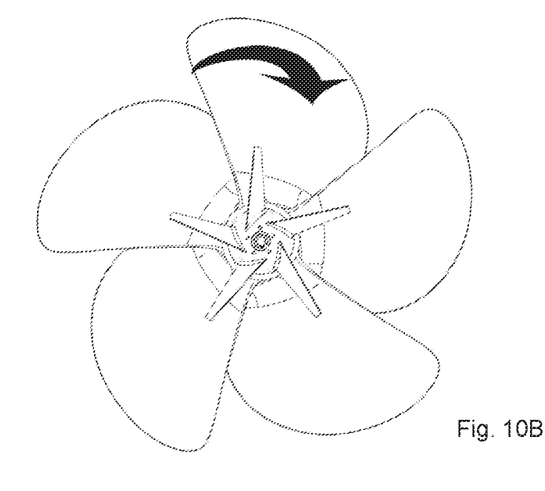
FIG. 10B shows the rotational condition of the propellers corresponding to the condition in FIG. 10A.

In FIG. 8A and FIG. 10B, in forward movement of the vessel, the front propeller (1) and the rear propeller (34) rotate in the same direction. For this purpose, several positions before the locking elements (18) become operational are shown in these figures. In FIG. 8A, a representative locking element is positioned on the uppermost part of a respective seating surface. The front propeller (1) follows the locking element seating surface due to the spring (19) as it rotates clockwise according to the figure (FIG. 9A) and abuts against the back surface (30) of the next pitch and since it cannot move further, locking is achieved (FIG. 10A). Thus, the front propeller (1) and the rear propeller (34) rotate in the same direction.

Figure 11A:
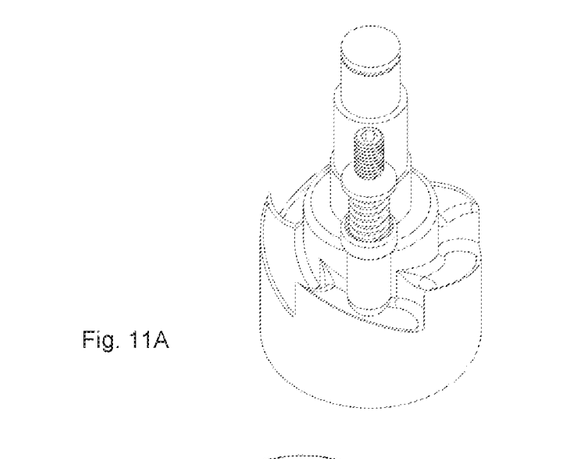
FIG. 11A is a perspective view of the locking element and adapter in the initial position prior to release of the rear propeller locking.
Figure 11B:
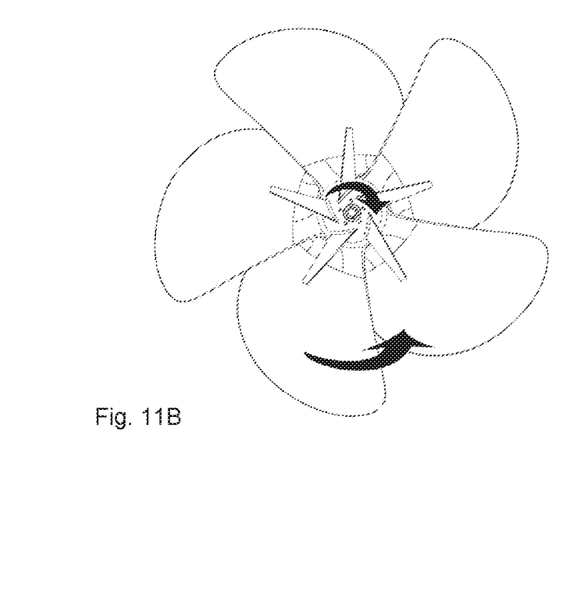
FIG. 11B shows the rotational condition of the propellers corresponding to the condition in FIG. 11A.
Figure 12A:
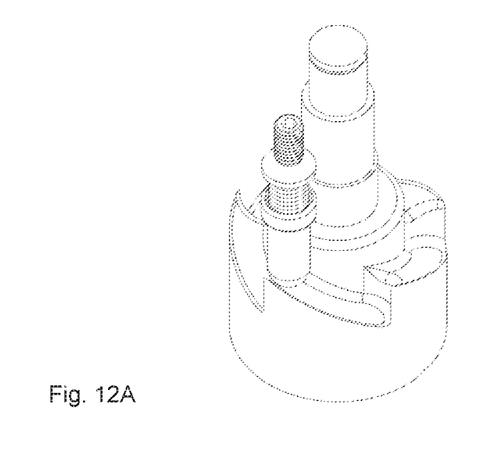
FIG. 12A is a perspective view of the locking element and adapter in the intermediate position prior to release of the rear propeller locking.
Figure 12B:
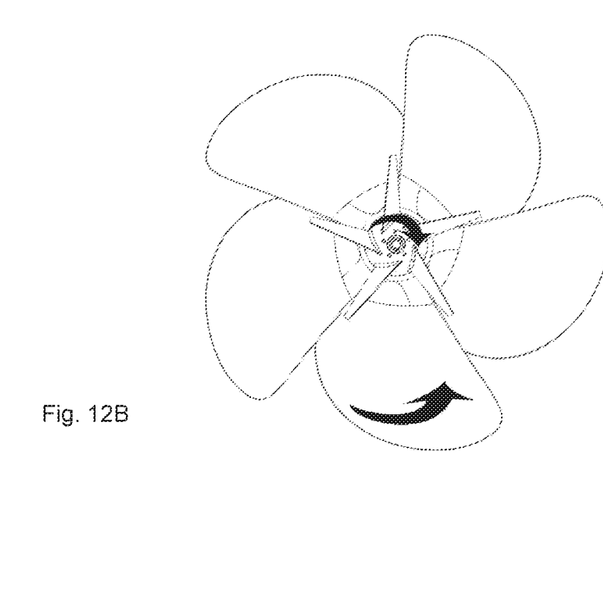
FIG. 12B shows the rotational condition of the propellers corresponding to the condition in FIG. 12A.
Figure 13A:
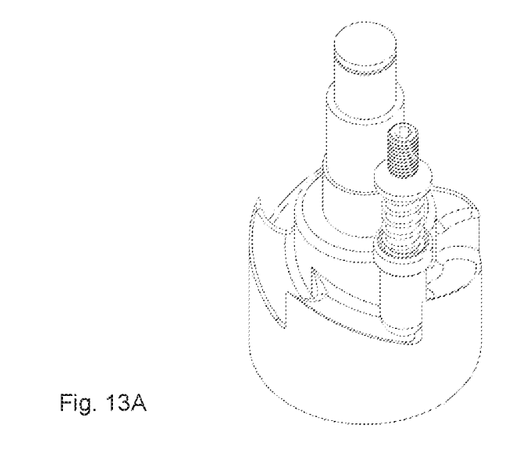
FIG. 13A is a perspective view of the locking element and adapter in the rear propeller locking release position.
Figure 13B:
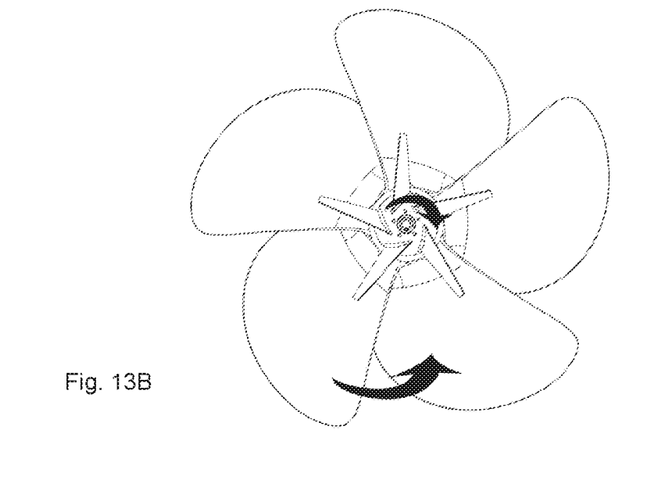
FIG. 13B shows the rotational condition of the propellers corresponding to the condition in FIG. 13A.

In FIG. 11A and FIG. 13B, in rearward movement of the vessel, the front propeller (1) and the rear propeller (34) rotate in the opposite direction. For this purpose, several positions are shown in these figures before the locking elements (18) are released. In FIG. 11A, a representative locking element is released from the back surface of the next pitch. The front propeller (1) follows the locking element seating surface due to the spring (19) as it rotates counter-clockwise according to the figure (FIG. 12A) and goes up and reaches to the uppermost part of seating surface and since there is no barrier at this point, it skips to the next pitch seating surface (FIG. 13A). In other words, the rear propeller (34) is free to rotate relative to the front propeller.

The invention claimed is:

1. A propeller device comprising:
a main shaft;
a front propeller provided on the main shaft, the front propeller having a hub and a plurality of blades extending radially outwardly from the hub;
a rear propeller being co-axially to and spaced apart from the front propeller backwardly in an axial direction, the rear propeller having a hub and a plurality of blades extending radially outwardly from the hub, wherein an adaptor is coaxial with the main shaft, said adaptor comprising a second shaft for supporting the rear propeller and a plurality of pitched-formed seating surfaces having ramps, the pitched-formed seating surfaces being spaced apart from the second shaft in the axial direction, and the adaptor communicating with a rear side of the front propeller in the axial direction;
a plurality of locking elements resiliently movable in the axial direction, one of said locking elements being in contact with one of said pitched-formed seating surfaces and communicating with the rear propeller.

2. A device according to claim 1, wherein one of said locking elements abuts against one of said pitch-formed seating surfaces, each pitch-formed seating surface comprising a back surface extending in the axial direction.

3. A device according to claim 2, wherein the upper end of the back surface has a rounded form.

4. A device according to claim 3, wherein each pitch-formed seating surface comprises a front surface positioned on the front side of its back surface and having a rounded form.

5. A device according to claim 1, having a plurality of springs and a plurality of pins, wherein one of said springs is placed between one of said pins and one of said locking elements, said pin being insertable in an axial direction.

6. A device according to claim 5, further comprising pin housings formed on the rear propeller hub for inserting each pin.

7. A marine vessel comprising:
a propeller device, said propeller device comprising;
a main shaft;
a front propeller provided on the main shaft, the front propeller having a hub and a plurality of blades extending radially outwardly from the hub;
a rear propeller being co-axially to and spaced apart from the front propeller backwardly in an axial direction, the rear propeller having a hub and a plurality of blades extending radially outwardly from the hub, wherein an adaptor is coaxial with the main shaft, said adaptor comprising a second shaft for supporting the rear propeller and a plurality of pitched-formed seating surfaces having ramps, the pitched-formed seating surfaces being spaced apart from the second shaft in the axial direction, and the adaptor communicating with a rear side of the front propeller in the axial direction; and
a plurality of locking elements resiliently movable in the axial direction, one of said locking elements being in contact with one of said pitched-formed seating surfaces and communicating with the rear propeller.

* * * * *